US012254835B2

(12) United States Patent
Kim et al.

(10) Patent No.: US 12,254,835 B2
(45) Date of Patent: *Mar. 18, 2025

(54) DISPLAY DEVICE HAVING STATIC ELECTRICITY DISCHARGE ELEMENT

(71) Applicant: Samsung Display Co., Ltd., Yongin-si (KR)

(72) Inventors: Kwang-Min Kim, Seoul (KR); Seung-Kyu Lee, Asan-si (KR); Won Kyu Kwak, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,728

(22) Filed: Dec. 19, 2023

(65) Prior Publication Data

US 2024/0119904 A1 Apr. 11, 2024

Related U.S. Application Data

(63) Continuation of application No. 18/103,145, filed on Jan. 30, 2023, now Pat. No. 11,893,941, which is a (Continued)

(30) Foreign Application Priority Data

Aug. 24, 2017 (KR) ........................ 10-2017-0107248

(51) Int. Cl.

*G09G 3/3258* (2016.01)
*G09G 3/00* (2006.01)
*G09G 3/3266* (2016.01)

(52) U.S. Cl.

CPC ........... *G09G 3/3258* (2013.01); *G09G 3/006* (2013.01); *G09G 3/3266* (2013.01); (Continued)

(58) Field of Classification Search

CPC .... G09G 3/3258; G09G 3/006; G09G 3/3266; G09G 2300/0426; G09G 2330/02; (Continued)

(56) References Cited

U.S. PATENT DOCUMENTS 7,321,414 B2 1/2008 Sekiguchi et al.
8,698,768 B2 4/2014 Lee et al.
(Continued)

FOREIGN PATENT DOCUMENTS

KR 10-2009-0090677 A 8/2009
KR 10-0941835 B1 2/2010

*Primary Examiner* — Rodney Amadiz
(74) *Attorney, Agent, or Firm* — Innovation Counsel LLP

(57) ABSTRACT

A display device is provided. The display device may include a substrate, a plurality of pixels, a first data line, a second data line, a defect sensing line, a first input pad, and a static electricity discharge element. The substrate may include a display area and a peripheral area neighboring each other. The plurality of pixels may be positioned on the display area and may include a first pixel and a second pixel. The first data line may be electrically connected to the first pixel. The second data line may be electrically connected to the second pixel and may be electrically isolated from the first data line. The defect sensing line may be positioned on the peripheral area. The first input pad may be electrically connected to the defect sensing line. The static electricity discharge element may be electrically connected through the defect sensing line to the first input pad.

20 Claims, 9 Drawing Sheets

Related U.S. Application Data continuation of application No. 17/827,520, filed on May 27, 2022, now Pat. No. 11,568,818, which is a continuation of application No. 16/896,138, filed on Jun. 8, 2020, now Pat. No. 11,348,527, which is a continuation of application No. 16/111,831, filed on Aug. 24, 2018, now Pat. No. 10,679,561.

(52) U.S. Cl.
CPC . *G09G 2300/0426* (2013.01); *G09G 2330/02* (2013.01); *G09G 2330/04* (2013.01); *G09G 2330/12* (2013.01)

(58) Field of Classification Search
CPC ........... G09G 2330/04; G09G 2330/12; G09G 3/3208; G09G 2330/06; G09G 2380/02; G09F 9/335; G09F 9/35; H01L 22/32; H01L 23/60
See application file for complete search history.

(56) References Cited

U.S. PATENT DOCUMENTS

| | | | | |
|---|---|---|---|---|
| 9,129,927 | B2 | 9/2015 | Gupta et al. | |
| 10,078,976 | B2 | 9/2018 | Nam et al. | |
| 10,204,921 | B2 | 2/2019 | Dong et al. | |
| 10,700,020 | B2 | 6/2020 | Lin et al. | |
| 10,861,361 | B2 | 12/2020 | Kim et al. | |
| 11,315,454 | B2 | 4/2022 | Kim et al. | |
| 11,568,818 | B2 | 1/2023 | Kim et al. | |
| 11,893,941 | B2 * | 2/2024 | Kim | G09G 3/006 |
| 2011/0267323 | A1 | 11/2011 | Fujikawa | |
| 2014/0176838 | A1 | 6/2014 | Hong et al. | |
| 2014/0176844 | A1 | 6/2014 | Yanagisawa | |
| 2014/0185169 | A1 | 7/2014 | Jung et al. | |
| 2016/0027372 | A1 | 1/2016 | Yan | |
| 2016/0225312 | A1 | 8/2016 | Byun et al. | |
| 2016/0232826 | A1 * | 8/2016 | Cho | H10K 59/131 |
| 2022/0114930 | A1 | 4/2022 | Jiang et al. | |
| 2022/0115464 | A1 | 4/2022 | Han et al. | |
| 2022/0137738 | A1 | 5/2022 | Kim et al. | |
| 2022/0254286 | A1 | 8/2022 | Kim et al. | |

* cited by examiner

DISPLAY DEVICE HAVING STATIC ELECTRICITY DISCHARGE ELEMENT

CROSS-REFERENCE TO RELATED APPLICATIONS

This application is a continuation application of U.S. patent application Ser. No. 18/103,145 filed on Jan. 30, 2023, which is a continuation application of U.S. patent application Ser. No. 17/827,520 filed on May 27, 2022 (now U.S. Pat. No. 11,568,818), which is a continuation application of U.S. patent application Ser. No. 16/896,138 filed on Jun. 8, 2020 (now U.S. Pat. No. 11,348,527), which is a continuation application of U.S. patent application Ser. No. 16/111,831 filed on Aug. 24, 2018 (U.S. Pat. No. 10,679, 561), which claims priority to Korean Patent Application No. 10-2017-0107248 filed in the Korean Intellectual Property Office on Aug. 24, 2017, the entire contents of which are incorporated herein by reference.

BACKGROUND

(a) Technical Field

The technical field relates to a display device.

(b) Description of the Related Art

A display device, such as a liquid crystal display (LCD) or an organic light emitting diode (OLED) display, may include a display panel that includes a plurality of pixels and a plurality of signal lines. Each pixel may include a pixel electrode connected through a transistor to a signal line for receiving a data signal. The display panel may include a plurality of stacked layers, including a substrate.

In the manufacturing process of the display panel, when the display panel receives an impact, cracks may occur in the substrate and/or other layers. The cracks may grow larger and/or spread in the display panel over time, causing significant defects. For example, if a crack is generated in a signal line (such as a data line or a scanning line), the signal line may be disconnected, or the resistance of the signal line may increase, such that signals cannot be properly transmitted. Moisture etc. may penetrate into the display panel through cracks, such that the reliability of the display device may be reduced. As a result, the display device may malfunction.

The above information disclosed in this Background section is for enhancement of understanding of the relevant background. The Background section may contain information that does not form the prior art that is already known in this country to a person of ordinary skill in the art.

SUMMARY

An embodiment may protect a defect-detecting circuit and/or a defect-detecting electrical element in a display panel from static electricity. An embodiment may optimize accuracy of defect detection during testing of the display panel.

A display device according to an embodiment may comprise the following elements: a substrate comprising a display area comprising a plurality of pixels, a pad area comprising a plurality of input pads, and a circuit area positioned between the pad area and the display area and comprising a crack sensing circuit; a crack sensing line comprising a part positioned around the display area and two ends, wherein the two ends comprise a first end connected to a first input pad among the plurality of input pads and a second end; and a plurality of data lines connected to the plurality of pixels, wherein the crack sensing circuit comprises a static electricity discharge element connected to the second end.

The circuit area may comprise a center area positioned at a center thereof, and the static electricity discharge element may be positioned at the center area.

The circuit area may comprise a first switching element comprising an input terminal connected to the first end and an output terminal connected to a first data line among the plurality of data lines, and a second switching element comprising an input terminal connected to the second end and an output terminal connected to a second data line among the plurality of data lines, and the first and second switching elements may not be positioned at the center area.

A first test data line connecting the first end and the first switching element to each other, and a second test data line connecting the second end and the second switching element to each other, may be further comprised.

The static electricity discharge element may be connected to the first test data line and the second test data line.

The static electricity discharge element may comprise a capacitor comprising a third end connected to the first test data line, and a fourth end connected to the second test data line as two terminals.

The second test data line may comprise a plurality of sub-wires, and the capacitor may comprise a plurality of sub-capacitors respectively connected to a corresponding sub-wire of the plurality of sub-wires.

A connection wire connected to the first end and extending approximately parallel to the first test data line maybe further comprised, and the static electricity discharge element may be connected to the connection wire and the second test data line.

The static electricity discharge element may comprise a capacitor comprising a third end connected to the connection wire and a fourth end connected to the second test data line as two terminals.

The second test data line may comprise a plurality of sub-wires, and the capacitor may comprise a plurality of sub-capacitors respectively connected to a corresponding sub-wire of the plurality of sub-wires.

The substrate may further comprise a bending area positioned between the display area and the circuit area, the crack sensing line may comprise a part positioned at the bending area, a voltage transmitting line having a part extending along a circumference of the display area and a part crossing the bending area may be further comprised, and the voltage transmitting line and the crack sensing line may be positioned at a same layer as each other in the bending area.

A display device according to an embodiment may comprise the following elements: a substrate comprising a display area comprising a plurality of pixels, a pad area comprising a plurality of input pads, and a circuit area positioned between the pad area and the display area and comprising a crack sensing circuit; a crack sensing line comprising a part positioned around the display area and two ends, wherein the two ends comprise a first end connected to a first input pad among the plurality of input pads and a second end; and a plurality of data lines connected to the plurality of pixels, wherein the crack sensing circuit comprises at least one capacitor comprising a third end connected to the first input pad and a fourth end connected to the second end as two terminals.

The circuit area may comprise a center area positioned at a center thereof, and the capacitor may be positioned at the center area.

The circuit area may comprise a first switching element having an input terminal connected to the first end and an output terminal connected to a first data line among the plurality of data lines, and a second switching element having an input terminal connected to the second end and an output terminal connected to a second data line among the plurality of data lines, and the first and second switching elements may not be positioned at the center area.

A first test data line connecting the first end and the first switching element to each other and a second test data line connecting the second end and the second switching element to each other may be further comprised, the third end may be connected to the first test data line, and the fourth end may be connected to the second test data line.

A first test data line connecting the first end and the first switching element to each other, a second test data line connecting the second end and the second switching element to each other, and a connection wire connected to the first end and extending approximately parallel to the first test data line may be further comprised, the third end may be connected to the connection wire, and the fourth end is connected to the second test data line.

An embodiment may be related to a display device. The display device may include a substrate, a plurality of pixels, a first data line, a second data line, a defect sensing line, a first input pad, and a static electricity discharge element. The substrate may include a display area and a peripheral area neighboring each other. The plurality of pixels may be positioned on the display area and may include a first pixel and a second pixel. The first data line may be electrically connected to the first pixel. The second data line may be electrically connected to the second pixel and may be electrically isolated from the first data line. The defect sensing line may be positioned on the peripheral area. The first input pad may be electrically connected to the defect sensing line. The static electricity discharge element may be electrically connected through the defect sensing line to the first input pad.

An edge of the display area may be positioned between the defect sensing line and the static electricity discharge element.

The display device may include a first switching element and a second switching element. An input terminal of the first switching element may be electrically connected to the defect sensing line. An output terminal of the first switching element may be electrically connected to the first data line. An input terminal of the second switching element may be electrically connected through the defect sensing line to the input terminal of the first switching element. An output terminal of the second switching element may be electrically connected to the second data line.

The display device may include the following elements: a first test data line electrically connecting the defect sensing line and the first switching element to each other; and a second test data line electrically connecting the defect sensing line and the second switching element to each other.

The static electricity discharge element may be electrically connected between the first test data line and the second test data line.

The static electricity discharge element may include a capacitor. A first terminal of the capacitor may be electrically connected to the first test data line. A second terminal of the capacitor may be electrically connected to the second test data line.

The second test data line may include a plurality of sub-wires. The capacitor may include a plurality of sub-capacitors. The sub-capacitors may be respectively electrically connected to a corresponding sub-wire of the sub-wires.

The display device may include a connection wire electrically connected to the defect sensing line and extending parallel to the first test data line. The static electricity discharge element may be electrically connected through the connection wire to the first test data line.

The static electricity discharge element may include a capacitor. A first terminal of the capacitor may be electrically connected to the connection wire. A second terminal of the capacitor may be electrically connected to the second test data line.

The second test data line may include a plurality of sub-wires. The capacitor may include a plurality of sub-capacitors. The sub-capacitors may be respectively electrically connected to a corresponding sub-wire of the sub-wires.

The display device may include the following elements: a voltage transmitting line positioned between the defect sensing line and the plurality of pixels; and an insulating layer positioned on the substrate. The substrate may further include a bent portion bent relative to the display area. A portion of the insulating layer may be positioned on the bent portion. A section of the defect sensing line may be positioned on the bent portion and may directly contact the portion of the insulating layer. A section of the voltage transmitting line may be positioned on the bent portion and may directly contact the portion of the insulating layer.

The static electricity discharge element may include a capacitor. A first terminal of the capacitor may be electrically connected through the defect sensing line to the first input pad.

The first terminal of the capacitor may be electrically connected to the first input pad through both a first section of the defect sensing line and a second section of the defect sensing line. The first section of the defect sensing line and the second section of the defect sensing line may extend parallel to each other.

The display device may include a first switching element positioned between the defect sensing line and the static electricity discharge element. An input terminal of the first switching element may be electrically connected to the defect sensing line. An output terminal of the first switching element may be electrically connected to the first data line.

The display device may include the following elements: a second switching element. An input terminal of the second switching element may be electrically connected to the defect sensing line. An output terminal of the second switching element may be electrically connected to the second data line. The static electricity discharge element may be positioned between the first switching element and the second switching element.

The substrate may further include a bent portion bent relative to the display area. A first section of the defect sensing line may be positioned on the bent portion. The static electricity discharge element may be electrically connected through the first section of the defect sensing line to the first input pad.

A second section of the defect sensing line may be spaced from the first section of the defect sensing line and may be positioned on the bent portion. The static electricity discharge element may be electrically connected through both the first section of the defect sensing line and the second section of the defect sensing line to the first input pad.

The static electricity discharge element may be positioned between the bent portion and the first switching element.

The first data line and the second data line immediately neighbor each other with no intervening data line. The static electricity discharge element may be electrically connected between the first data line and the second data line.

The display device may further include: a test data line intersecting the first data line and electrically connecting the static electricity discharge element to the defect sensing line.

According to embodiments, the circuit and/or electrical elements for detecting defects, such as cracks, generated in a display panel may be protected from static electricity, and the accuracy of defect detection may be optimized during testing of the display panel.

DETAILED DESCRIPTION

Figure 1:
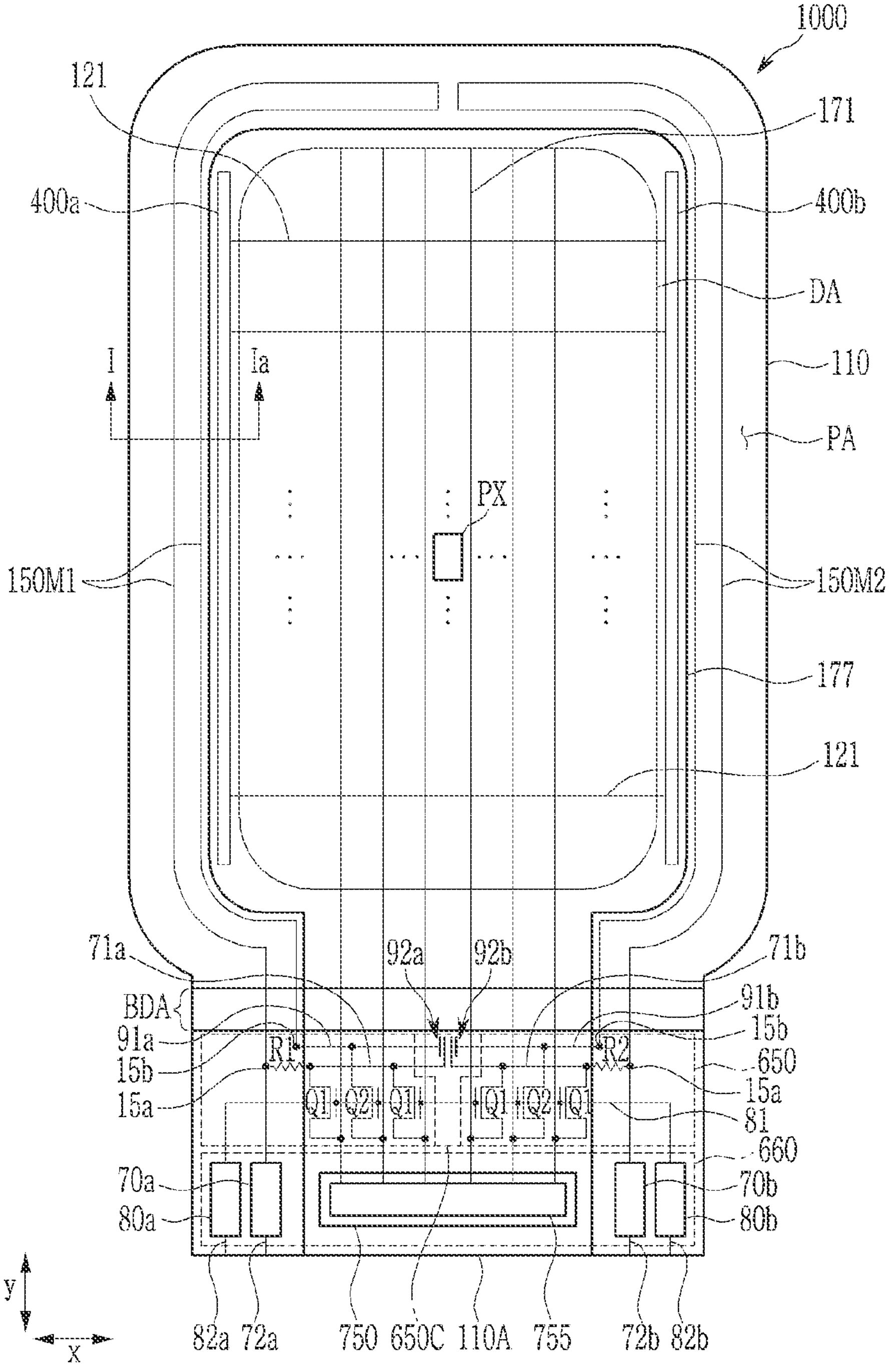
FIG. 1 is a top plan view of a display panel included in a display device according to an embodiment.

Example embodiments are described with reference to the accompanying drawings. As those skilled in the art would realize, the described embodiments may be modified in various different ways.

Although the terms "first," "second," etc. may be used herein to describe various elements, these elements, should not be limited by these terms. These terms may be used to distinguish one element from another element. Thus, a first element may be termed a second element without departing from teachings of one or more embodiments. The description of an element as a "first" element may not require or imply the presence of a second element or other elements. The terms "first," "second," etc. may also be used herein to differentiate different categories or sets of elements. For conciseness, the terms "first," "second," etc. may represent "first-type (or first-set)," "second-type (or second-set)," etc., respectively.

In the drawings, for better understanding and ease of description, the thicknesses of some elements may be exaggerated.

When a first element is referred to as being "on" a second element, the first element can be directly on the second element, or one or more intervening elements may be present between the first element and the second element. When a first element is referred to as being "directly on" a second element, there are no intended intervening elements (except environmental elements such as air) present between the first element and the second element. The word "on" or "above" may mean positioned on or below the object portion, and does not necessarily mean positioned on the upper side of the relative object based on a gravitational direction.

Unless explicitly described to the contrary, the word "comprise" and variations such as "comprises" or "comprising" may imply the inclusion of stated elements but not the exclusion of other elements. The term "connect" may mean "electrically connect"; the term "insulate" may mean "electrically insulate."

Figure 2:
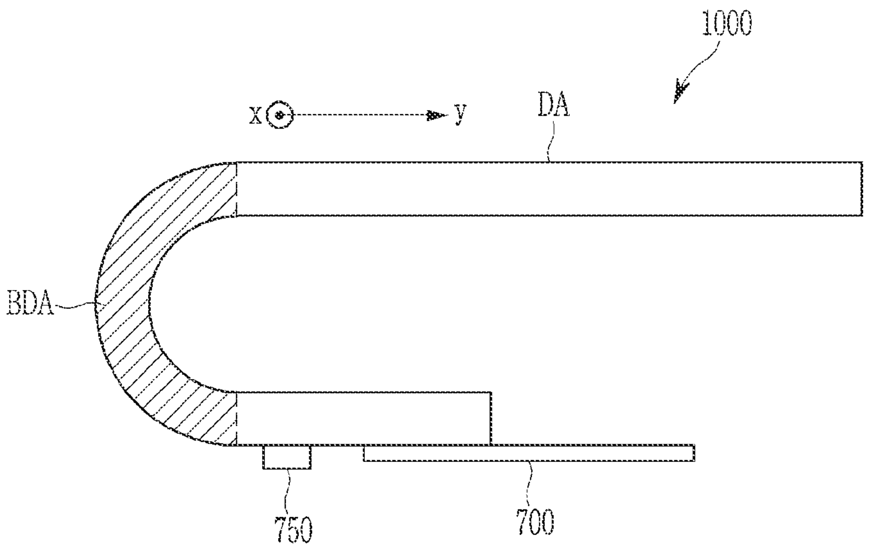
FIG. 2 is a side view showing a display panel that has a bent portion according to an embodiment.

FIG. 1 is a top plan view of a display panel included in a display device according to an embodiment. FIG. 2 is a side view showing a display panel that has a bent portion according to an embodiment.

Referring to FIG. 1 and FIG. 2, a display device according to an embodiment may include a display panel 1000 having a display area DA as an area for displaying an image and a peripheral area PA neighboring, abutting, and/or surrounding the display area DA. The display panel 1000 includes a substrate 110. The substrate 110 may include a display area and a peripheral area respectively corresponding to the display area DA and peripheral area PA of the display panel 1000.

The substrate 110 may include at least one of glass, plastic, etc., and may have flexibility. For example, the substrate 110 may be formed of a plastic material (such as PET, PEN, PC, PAR, PEI, PES, or PI), a metal thin film, or a thin film glass.

The display area DA may display the image on a surface parallel to a plane defined by an x direction and a y direction. A structure observed when viewing in a direction perpendicular to the x direction and the y direction may be referred to as a plane structure, and a structure observed when cut along a direction perpendicular to the x direction or the y direction may be referred to as a cross-sectional structure.

The display area DA includes a plurality of pixels PX and a plurality of signal lines.

The signal lines include a plurality of gate lines 121 for transmitting gate signals and a plurality of data lines 171 for transmitting data signals. Each gate line 121 substantially extends in the x direction in the display area DA, and may be connected to gate drivers 400*a* and 400*b* outside the display area DA. Each data line 171 substantially extends in the y direction in the display area DA, and also extends outside the display area DA.

A pixel PX may include a switching element and a pixel electrode connected to the switching element. The switching element may be a three-terminal element such as a transistor integrated on the display panel 1000. The switching element is turned on or turned off depending on the gate signal transmitted by the gate line 121, for controlling transmission of a data signal to the pixel electrode.

In order to implement a color display, each pixel PX may display one of predetermined colors, and an image of a desired color may be recognized by combining images displayed by the predetermined colors. An example of the predetermined colors displayed by the plurality of pixels PX may be three primary colors of red, green, and blue, or three primary colors of yellow, cyan, and magenta, and at least one different color such as white may be further included as well as the three primary colors.

In addition to the display area DA, as shown in FIG. 1, the display panel 1000 may include the peripheral area PA, a bending area BDA (which may be bent relative to the display area DA), a circuit area 650, a pad area 660, etc.

The peripheral area PA positioned around the display area DA may be an area adjacent to the display area DA and enclosing the display area DA. The bending area BDA may be positioned under a lower side of the display area DA, and may extend across the display panel 1000 in the x direction. The pad area 660 is positioned outside the bending area BDA, thereby being positioned to be adjacent to the display panel 1000 or a lower edge 110A of the substrate 110. That is, the bending area BDA may be positioned between the display area DA and the pad area 660. The circuit area 650 includes a plurality of electrical elements such as the transistor and may be positioned under the lower side of the display area DA. As shown in FIG. 1, the circuit area 650 may be positioned between the bending area BDA and the pad area 660, or alternately, it may be positioned between the display area DA and the bending area BDA or at the peripheral area PA on an upper side of the display area DA.

The peripheral area PA may include the gate drivers 400*a* and 400*b*, voltage transmitting lines 177, and crack sensing lines 150M1 and 150M2 (or defect sensing lines 150M1 and 150M2).

The gate drivers 400*a* and 400*b* are connected to the plurality of gate lines 121, for applying gate signals. The gate drivers 400*a* and 400*b* may be formed on the substrate 110 along with the plurality of signal lines and the switching element positioned on the display area DA. FIG. 1 shows an example in which the gate drivers 400*a* and 400*b* are positioned one by one on the right and left sides based on the display area DA. In an embodiment, either one of the gate drivers 400*a* and 400*b* may be unnecessary.

The voltage transmitting line 177 may extend along at least three sides such as the upper, right, and left sides of the display area DA, and may transmit a predetermined voltage such as a common voltage.

Each of the crack sensing lines 150M1 and 150M2 may have two ends including a first end 15*a* and a second end 15*b*, and may extend along the left side and a part of the upper side, or along the right side and a part of the upper side of the display area DA, between the first end 15*a* and the second end 15*b*. For example, the crack sensing line 150M1 may include a part substantially extending in the y direction in the left peripheral area PA of the display area DA and a part substantially extending in the x direction in the upper peripheral area PA of the left half of the display area DA, and the crack sensing line 150M2 may include a part substantially extending in the y direction in the right peripheral area PA of the display area DA and a part substantially extending in the x direction in the upper peripheral area PA of the right half of the display area DA.

Each of the crack sensing lines 150M1 and 150M2 may start from the first end 15*a* connected to the pad area 660, extend along the circumference of the display area DA in the peripheral area PA through the bending area BDA, reciprocate at least once in the right/left or upper peripheral area PA of display area DA to form at least one bending part, and again pass the bending area BDA to be connected to the circuit area 650 at the second end 15*b*. The first end 15*a* of the crack sensing lines 150M1 and 150M2 is connected to the pad area 660, thereby receiving a test voltage.

When a cross-sectional position of a conductive layer positioned at the bending area BDA and a cross-sectional position of the crack sensing lines 150M1 and 150M2 positioned at the peripheral area PA are not same, the crack sensing lines 150M1 and 150M2 may include at least one contact part positioned above and below the bending area BDA. The crack sensing lines 150M1 and 150M2 may include parts positioned on different layers in a cross-section with respect to the contact part. The contact part may include at least one contact hole. In the bending area BDA, the voltage transmitting line 177 and the crack sensing lines 150M1 and 150M2 may all directly contact (the same surface/side of) the third insulating layer 160 shown in FIG. 6 and/or (a same surface/side of) another insulating layer.

In an embodiment, differently from FIG. 1, the left and right crack sensing lines 150M1 and 150M2 may be connected to each other on the display area DA. The connection relationship of the circuit area 650 and/or the pad area 660 and the crack sensing lines 150M1 and 150M2 may be different from the structure shown in FIG. 1.

In a plan view, in the peripheral area PA positioned at the right/left sides of the display area DA, the gate drivers 400*a* and 400*b* may be positioned between the edge of the display area DA and the voltage transmitting line 177, the voltage transmitting line 177 may be positioned between the gate drivers 400*a* and 400*b* and the crack sensing lines 150M1 and 150M2, and the crack sensing lines 150M1 and 150M2 may be positioned between the voltage transmitting line 177 and the edge of the substrate 110. However, the arrangement of these constituent elements may be changed in other ways.

The display panel 1000 is bent in the bending area BDA such that elements positioned in the circuit area 650 and/or the pad area 660 may be hidden behind the display panel 1000 and may not be seen from the front of the display device. FIG. 1 shows the state that the display panel 1000 is not significantly bent in the bending area BDA, and FIG. 2 schematically shows the state that the display panel 1000 is bent in the bending area BDA. A plurality of wires may pass the bending area BDA, and the plurality of wires may substantially extend in the y direction in the bending area BDA. At least part of the substrate 110 may be removed in the bending area BDA.

The bending area BDA may be unnecessary depending on the structure of the display device.

Referring to FIG. 1 and FIG. 2, the pad area 660 may include a plurality of pads that may be electrically connected to a pad of a driving chip 750 and/or a pad of a circuit film 700. According to an embodiment, the driving chip 750 and/or the circuit film 700 may be electrically connected to the display panel 1000 through the pad area 660.

As shown in FIG. 2, the driving chip 750 may be positioned on the display panel 1000 or on the circuit film 700. The driving chip 750 may include a driver generating a driving signal to drive the display panel 1000.

The circuit film 700 may be a film type. Referring to FIG. 2, the circuit film 700 may be connected to the area outside the bending area BDA when bending the display panel 1000. The driver, a timing controller, etc. may be positioned in the circuit film 700.

A plurality of pads included in the pad area 660 may include input pads 70*a* and 70*b* and input pads 80*a* and 80*b*.

The circuit area 650 is connected to the crack sensing lines 150M1 and 150M2, and includes a crack sensing circuit (or defect sensing circuit) capable of sensing defects (such as cracks or protrusions) that occur in the substrate 110 or the layers deposited on the substrate 110 at the peripheral area PA, based on a resistance change of at least one of the crack sensing lines 150M1 and 150M2. The resistance change of the crack sensing lines 150M1 and 150M2 may be confirmed by testing a lighting state of the display area DA through the crack sensing circuit.

The first ends 15*a* of the crack sensing lines 150M1 and 150M2 may be connected to input pads 70*a* and 70*b* of the pad area 660, and the second ends 15*b* of the crack sensing lines 150M1 and 150M2 may be connected to test data lines 91*a* and 91*b*. The first ends 15*a* of the crack sensing lines 150M1 and 150M2 connected to the input pads 70*a* and 70*b* may be connected to test data lines 71*a* and 71*b*.

Two test data lines 91*a* and 91*b* may be separated and electrically isolated from each other, and two test data lines 71*a* and 71*b* may also be separated and electrically isolated from each other. Each of the test data lines 71*a*, 71*b*, 91*a*, and 91*b* may substantially extend in the x direction, and may cross the data lines 171 while being insulated from the data lines 171.

The crack sensing circuit of the circuit area 650 may further include a test gate line 81 and a plurality of switching elements Q1 and Q2 connected to the test gate line 81.

The test gate line 81 is connected to the input pads 80*a* and 80*b* and may extend substantially in the x direction in the circuit area 650. The test gate line 81 may receive the gate signal for the test through the input pads 80*a* and 80*b*.

The plurality of switching elements Q1 and Q2 may be arranged in one row or a plurality of rows substantially extending in the x direction, and may be disposed corresponding to the part of the plurality of data lines 171. FIG. 1 shows an example in which the plurality of switching elements Q1 and Q2 are arranged in one row. The switching elements Q1 and Q2 may be alternately arranged in the x direction, and each of the switching elements Q1 and Q2 may be disposed one by one for each data line 171. The switching element Q2 may be disposed at the partial area of the circuit area 650, for example, a right partial area and a left partial area of the circuit area 650, and the switching element Q1 may be disposed at the remaining area. FIG. 1 shows an example in which one switching element Q2 is positioned at both the left side and the right side of the circuit area 650, but alternatively, a plurality of switching elements Q2 may be positioned to be adjacent to the switching elements Q1 in the x direction at the right side and the left side of the circuit area 650. Also, the arrangement of the switching elements Q1 and Q2 may be variously changed.

A gate terminal of each of the switching elements Q1 and Q2 is connected to the test gate line 81 and an output terminal thereof is connected to the corresponding data line 171. An input terminal of the switching element Q1 is connected to the test data lines 71*a* and 71*b*, and the input terminal of the switching element Q2 is connected to the test data lines 91*a* and 91*b*.

Referring to FIG. 1, the test data lines 71*a* and 71*b* between the input pads 70*a* and 70*b* and the switching element Q1 may include matching resistors R1 and R2. The test voltage applied through the input pads 70*a* and 70*b* may be applied to the input terminal of the switching element Q1 after being decreased by a first voltage difference via the matching resistors R1 and R2. On the other hand, the test voltage applied through the input pads 70*a* and 70*b* may be transmitted to the crack sensing lines 150M1 and 150M2, and the voltage that is decreased by a second voltage difference by a wire resistance of the crack sensing lines 150M1 and 150M2 may be applied to the input terminal of the switching element Q2 through the test data lines 91*a* and 91*b*. The resistance of each of the matching resistors R1 and R2 may be equal or close to the wire resistance of each of the crack sensing lines 150M1 and 150M2. Also, the resistance of the matching resistors R1 and R2 may be determined so that the first voltage difference and the second voltage difference are substantially equal or equivalent to each other in the case that there is no the damage such as the crack or the lifting in the crack sensing lines 150M1 and 150M2 as a normal state. In an embodiment, the resistance of the matching resistors R1 and R2 may be determined based on crack detection sensitivity. For example, the resistance of each of the matching resistors R1 and R2 may be determined to be approximately 1.5 times the wire resistance of each of the crack sensing lines 150M1 and 150M2.

The data line 171 may also extend below the circuit area 650 and may be connected to a lighting circuit 755 for testing the defect of the display area DA. The lighting circuit 755 may include the electrical element such as a plurality of transistors, etc. The lighting circuit 755 may be positioned below or above the display area DA. FIG. 1 shows an example in which the lighting circuit 755 is positioned at the pad area 660, particularly the area where the driving chip 750 is positioned.

Referring to FIG. 1, the display panel 1000 further includes static electricity discharge elements 92*a* and 92*b* respectively connected to the second ends 15*b* of the crack sensing lines 150M1 and 150M2. The static electricity discharge elements 92*a* and 92*b* may be connected to the wire connected to the second ends 15*b* of the crack sensing lines 150M1 and 150M2, for example, the test data lines 91*a* and 91*b*. The static electricity discharge elements 92*a* and 92*b* may each be/include a capacitor, a transistor, or a diode. The static electricity discharge elements 92*a* and 92*b* may each be/include an electrical element capable of storing or discharging static electricity flowing into one of the second ends 15*b* of the crack sensing lines 150M1 and 150M2. In an embodiment, each of the static electricity discharge elements 92*a* and 92*b* is the capacitor.

When each of the static electricity discharge elements 92*a* and 92*b* is a capacitor, one end/terminal of the capacitor may be connected to one of the test data lines 91*a* and 91*b*, and the other end/terminal may be connected to the wire connected to one of the input pads 70*a* and 70*b*, for example, one of the test data lines 71*a* and 71*b*. In an embodiment, each of the static electricity discharge elements 92*a* and 92*b* may be connected to the wire (e.g., one of the test data lines 91*a* and 91*b*) connected to the second end 15*b* of one of the crack sensing lines 150M1 and 150M2 and the wire (e.g., one of the test data lines 71*a* and 71*b*) connected to one of the input pads 70*a* and 70*b*. An output terminal of each of the switching elements Q1 and Q2 is connected to the corresponding data line 171, an input terminal of the switching element Q1 is connected to one of the test data lines 71*a* and 71*b*, and the input terminal of the switching element Q2 is connected to one of the test data lines 91*a* and 91*b*, and therefore, each of the static electricity discharge elements 92*a* and 92*b* may be electrically connected at between the data line 171 connected to the output terminal of the switching elements Q1 and the data line 171 connected to the output terminal of the switching elements Q2.

The static electricity discharge elements 92*a* and 92*b* may be positioned at a center area 650C that is substantially positioned at the center among the circuit area 650. According to an embodiment, as the plurality of switching elements Q1 and Q2 are positioned at the right/left sides of the circuit area 650 and the empty space where the switching elements Q1 and Q2 are not disposed is formed in the center area 650C, the static electricity discharge elements 92*a* and 92*b* may be positioned in this space. Accordingly, each of the test data lines 91*a* and 91*b* may extend to the center area 650C and each of the test data lines 71*a* and 71*b* may also extend to the center area 650C.

If there is no static electricity discharge elements 92*a* and 92*b* connected to the second ends 15*b* of the crack sensing lines 150M1 and 150M2, the crack sensing lines 150M1 and 150M2 having relatively large resistance serve as an antenna such that a large potential difference between a first 15*a* and a second end 15*b* of each of the crack sensing lines 150M1 and 150M2 may be easily generated. In that case, the static electricity tends to accumulate in the second end 15*b* of the crack sensing lines 150M1 and 150M2, so that the crack sensing circuits connected to the crack sensing lines 150M1 and 150M2 may be vulnerable to the static electricity, and a leakage current maybe generated in the switching element Q2 connected to the second ends 15*b* of the crack sensing lines 150M1 and 150M2. Thus, in a defect test step that is not a step for testing the defect such as the crack of the peripheral area PA, for example, in the defect test step of the display area DA using the lighting circuit 755, the lighting state of the pixel PX connected to the data line 171 connected to the switching element Q2 maybe erroneously displayed in the defect state. That is, even if there is no defect in the data line 171 connected to the switching element Q2 or the pixel PX connected thereto, the pixel PX column connected to the corresponding data line 171 is displayed in a weak dark line such that a defect may be erroneously detected.

In the display panel 1000 according to an embodiment, the second ends 15*b* of the crack sensing lines 150M1 and 150M2 are connected to the static electricity discharge elements 92*a* and 92*b*, such that the static electricity may be stored or discharged. For example, the static electricity may be stored in the capacitor of the static electricity discharge elements 92*a* and 92*b*, or may be discharged to the input pads 70*a* and 70*b* through the wires connected to the other ends of the capacitors, for example, the test data lines 71*a* and 71*b*. Accordingly, the damage due to the static electricity of the switching element Q2 of the crack sensing circuit may be prevented, and leakage current of the switching element Q2 may be prevented. Advantageously, erroneous detection of defects may be prevented in a defect testing process.

Shorting wires 72*a*, 72*b*, 82*a*, and 82*b* may be connected to the input pads 70*a*, 70*b*, 80*a*, and 80*b*, respectively. The shorting wires 72*a*, 72*b*, 82*a*, and 82*b* may extend from the input pads 70*a*, 70*b*, 80*a*, and 80*b* to the display panel 1000 or the lower edge 110A of the substrate 110. The ends of the shorting wires 72*a*, 72*b*, 82*a*, and 82*b* ending at the lower edge 110A may not be connected to another conductor but may be in a floating state. The shorting wires 72*a*, 72*b*, 82*a*, and 82*b* may be connected to a shorting bar positioned under the lower edge 110A during the manufacturing process, thereby transmitting a predetermined voltage such as a ground voltage.

Figure 3:
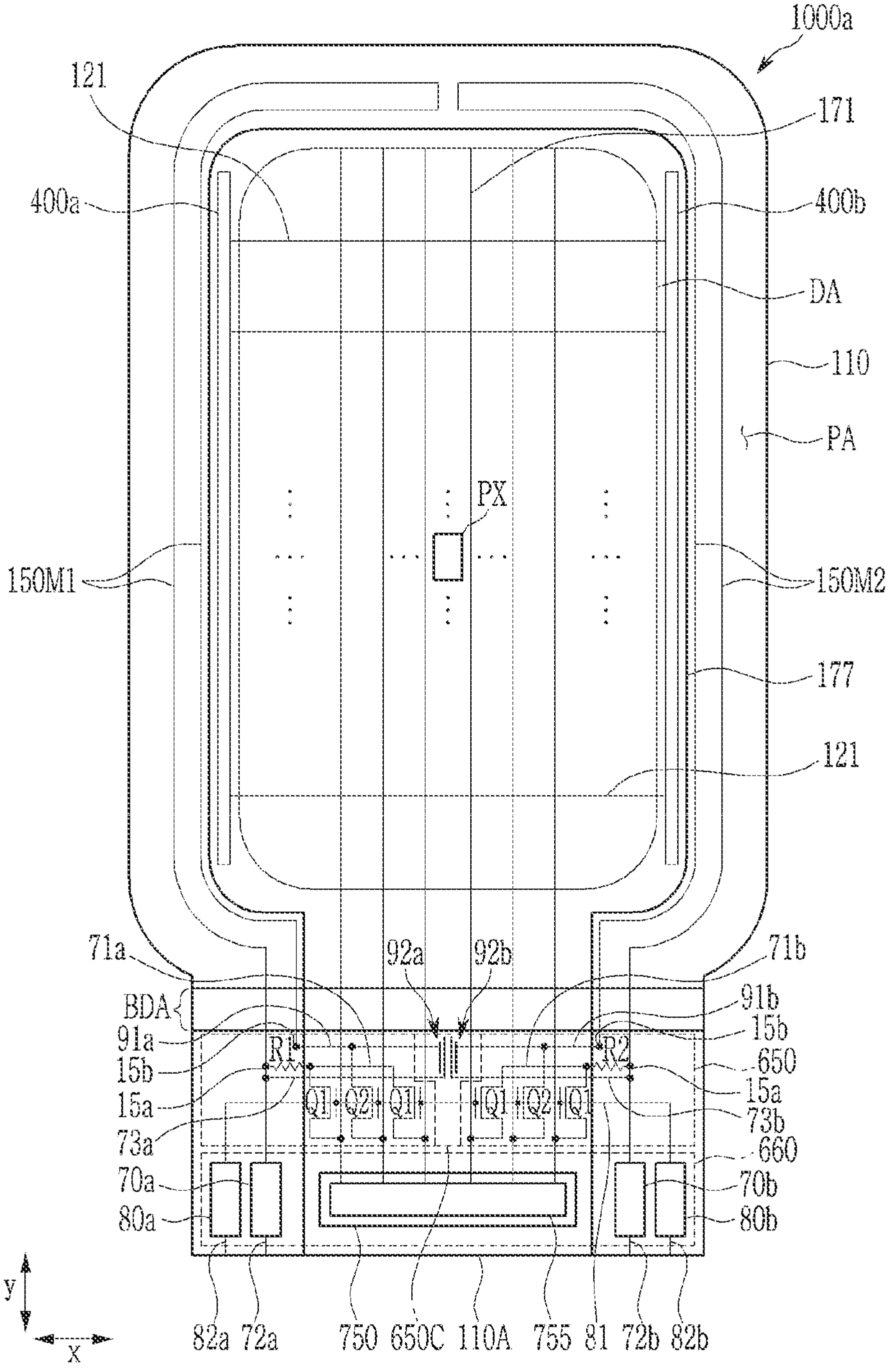
FIG. 3 is a top plan view of a display panel included in a display device according to an embodiment.

FIG. 3 is a top plan view of a display panel included in a display device according to an embodiment. A display panel 1000*a* illustrated in FIG. 3 may include features and/or structures discussed with reference to FIG. 1 and FIG. 2. However, one end of the capacitor of each of the static electricity discharge elements 92*a* and 92*b* is connected to one of the test data lines 91*a* and 91*b*, and the other end of the capacitor of each of the static electricity discharge elements 92*a* and 92*b* is connected to one of the connection wires 73*a* and 73*b* as a separate wire from the test data lines 71*a* and 71*b*. The connection wires 73*a* and 73*b* may be connected to the input pads 70*a* and 70*b* and the first ends 15*a* of the crack sensing lines 150M1 and 150M2, and may extend to be substantially parallel to the x direction in the circuit area 650 and substantially parallel to the test data lines 71*a* and 71*b*.

Figure 4:
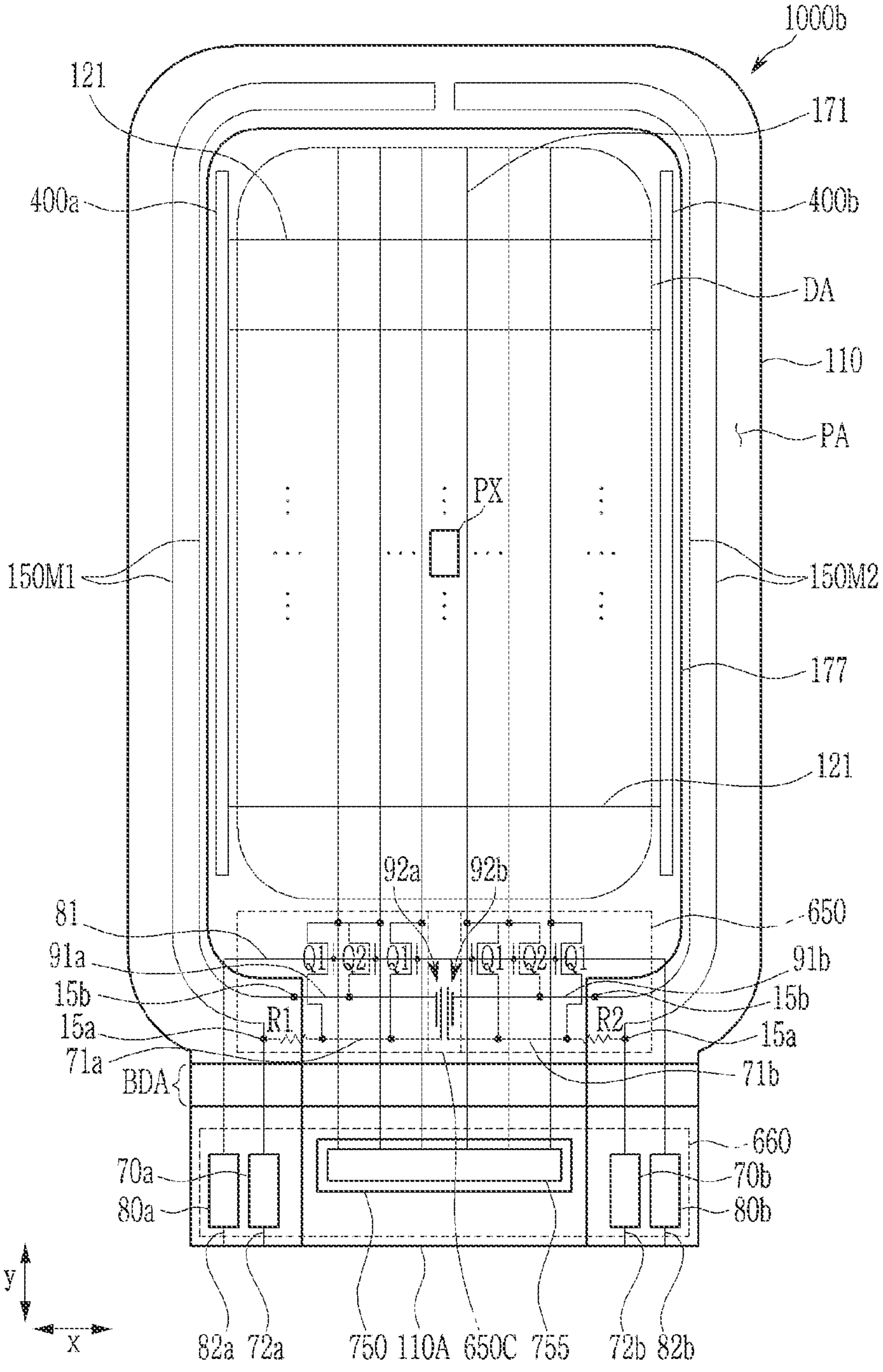
FIG. 4 is a top plan view of a display panel included in a display device according to an embodiment.

FIG. 4 is a top plan view of a display panel included in a display device according to an embodiment. A display panel 1000*b* illustrated in FIG. 4 may include structures and/or features discussed with reference to one of more of FIG. 1, FIG. 2, and FIG. 3. However, the circuit area 650 in which the crack sensing circuit is positioned may be positioned between the display area DA and the bending area BDA.

Accordingly, the wire connecting between the first ends 15*a* of the crack sensing lines 150M1 and 150M2 and the input pads 70*a* and 70*b* and the wire connecting between the test gate line 81 and the input pads 80*a* and 80*b* may cross the bending area BDA. The wires crossing the bending area BDA may include at least one contact part located around the upper and lower sides of the bending area BDA. The contact part may include at least one contact hole.

Figure 5:
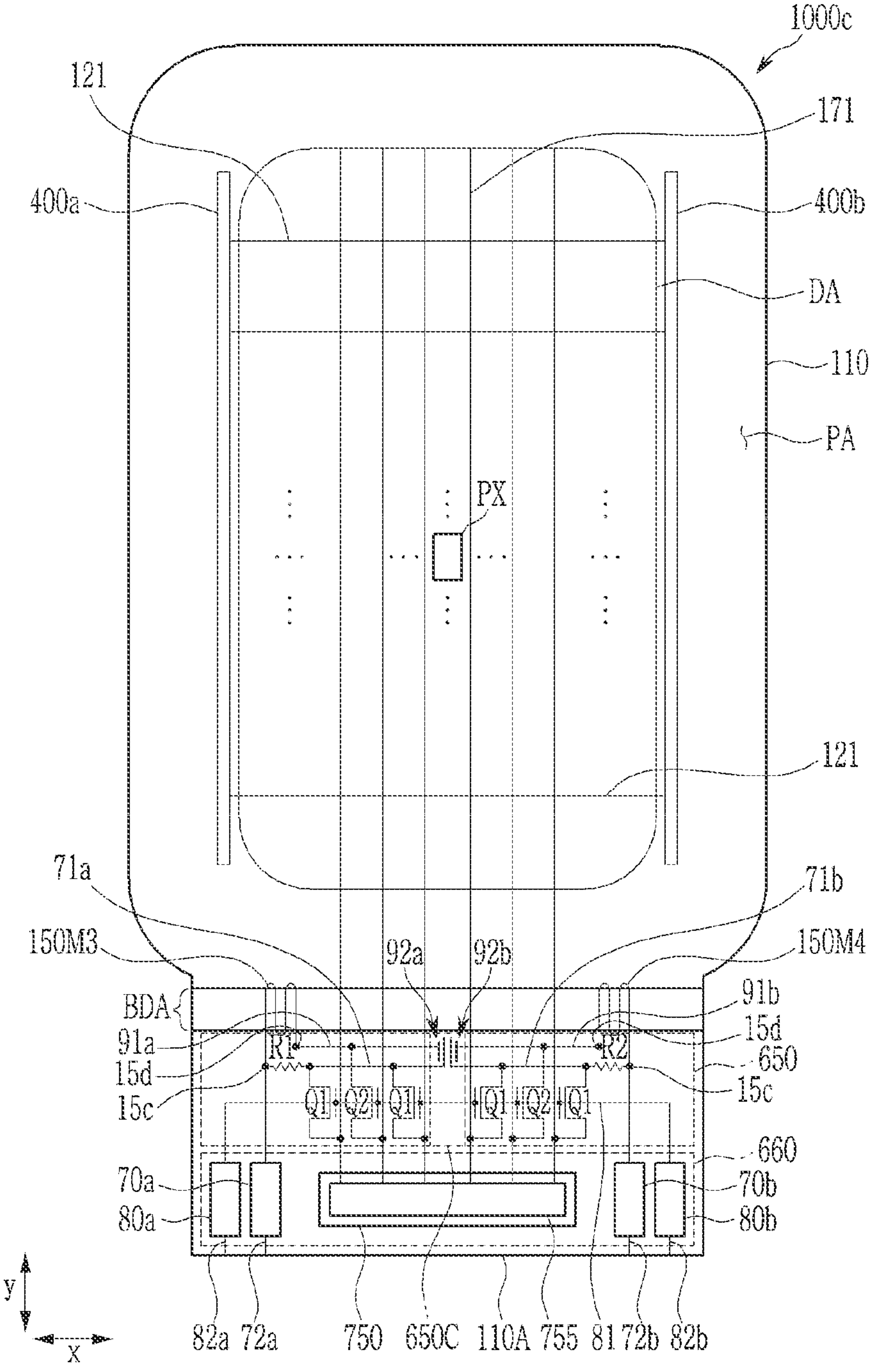
FIG. 5 is a top plan view of a display panel included in a display device according to an embodiment.

FIG. 5 is a top plan view of a display panel included in a display device according to an embodiment. A display panel 1000*c* illustrated in FIG. 5 may include features and/or structures discussed with reference to one of more of FIG. 1, FIG. 2, FIG. 3, and FIG. 4. However, the display panel 1000*c* may include bending crack sensing lines 150M3 and 150M4.

The bending crack sensing lines 150M3 and 150M4 used to detect whether the defect such as the crack of the bending area BDA occurs or not, unlike the crack sensing lines 150M1 and 150M2 described above, may be located to be substantially limited to the bending area BDA and its surroundings. In detail, the bending crack sensing lines 150M3 and 150M4 may each be positioned at the right/left edge areas of the bending area BDA, and may each start from one end 15*c* connected to the pad area 660, extend in the approximate y direction, reciprocate once or more times within the bending area BDA to form the bending part, and then be returned to be connected to the circuit area 650 at the another end 15*d*. One end 15*c* of each of the bending crack sensing lines 150M3 and 150M4 may be connected to the pad area 660, thereby receiving the test voltage.

When the cross-sectional position of the conductive layer positioned at the bending area BDA and the cross-sectional position of the bending crack sensing lines 150M3 and 150M4 positioned outside the bending area BDA are not same to each other, the bending crack sensing lines 150M3 and 150M4 may include at least one contact part located around the upper and lower sides of the bending area BDA. The bending crack sensing lines 150M3 and 150M4 may include parts positioned at different layers from each other on a cross-section based on the contact part. The contact part may include at least one contact hole.

In FIG. 5, the above-described crack sensing lines 150M1 and 150M2 are omitted and only the bending crack sensing lines 150M3 and 150M4 are shown. In an embodiment, the crack sensing lines 150M1 and 150M2 may also be included along with the bending crack sensing lines 150M3 and 150M4. In an embodiment, an additional crack sensing circuit connected to the crack sensing lines 150M1 and 150M2 may be further formed, and a configuration of this additional crack sensing circuit may be the same as that of the crack sensing circuit of the circuit area 650. In an embodiment, in the bending area BDA, the bending crack sensing line 150M3 positioned at the left side may be positioned between the crack sensing line 150M1 and the edge of the substrate 110, and the bending crack sensing line 150M4 positioned at the right side may be positioned between the crack sensing line 150M2 and the edge of the substrate 110.

The configuration like the connection relationship of the bending crack sensing lines 150M3 and 150M4 and the circuit area 650 of the display panel 1000*c* according to an embodiment and the effects thereof may be identical to or analogous to the configuration like the connection relationship of the crack sensing lines 150M1 and 150M2 and the circuit area 650 of the above-described display panels 1000, 1000*a*, and 1000*b* and the effects thereof.

One or more methods of testing a defect, such as a crack, of one of the display panels 1000, 1000*a*, 1000*b*, and 1000*c* according to one or more embodiments are described as follows.

First, a test voltage is applied to one end 15*a* and/or 15*c* of the crack sensing lines 150M1 and 150M2 and/or the bending crack sensing lines 150M3 and 150M4, and the test data lines 71*a* and 71*b* through the pad area 660. Along with this, if the gate signal of the gate-on voltage is applied to the test gate line 81, the switching elements Q1 and Q2 of the circuit area 650 are turned on, and the test voltage applied to the test data lines 71*a* and 71*b* is applied to the corresponding data line 171 through the turned-on switching element Q1. The test voltage as a predetermined voltage may be, for example, a voltage to display the pixel PX with a lowest gray, and in this case, it may be an approximately 7 V. Accordingly, the pixels PX connected to the turned-on switching element Q1 may display the low gray such as black.

If the crack, the lifting, etc. are not generated in the peripheral area PA and/or the bending area BDA of the display panels 1000, 1000*a*, 1000*b*, and 1000*c*, i.e., if they are in the normal state that the damage is not applied to the crack sensing lines 150M1 and 150M2 and/or the bending crack sensing lines 150M3 and 150M4, the voltage applied to the test data lines 91*a* and 91*b* of the circuit area 650 through the crack sensing lines 150M1 and 150M2 and/or the bending crack sensing lines 150M3 and 150M4 may be substantially the same as the voltage applied to the test data lines 71*a* and 71*b*. For this, the matching resistors R1 and R2 may be controlled. In this case, the pixels PX connected to the switching element Q2 may also display the predetermined gray such as black like the pixels PX connected to the switching element Q1.

However, if the crack, the lifting/protrusion, etc. are generated in the peripheral area PA and/or the bending area BDA of the display panels 1000, 1000*a*, 1000*b*, and 1000*c*, i.e., if the crack sensing lines 150M1 and 150M2 and/or the bending crack sensing lines 150M3 and 150M4 are disconnected or damaged such that the wire resistance is increased, a black data voltage is not applied to the pixels PX connected to the switching element Q2 or the black data voltage is not sufficiently applied. According, a hard white line or a weak white line may be recognized along the column of the pixels PX connected to the switching element Q2. As above-described, the defect such as the crack generated in the peripheral area PA and/or the bending area BDA of the display panels 1000, 1000*a*, 1000*b*, and 1000*c* may be detected through the recognized white line.

Figure 6:
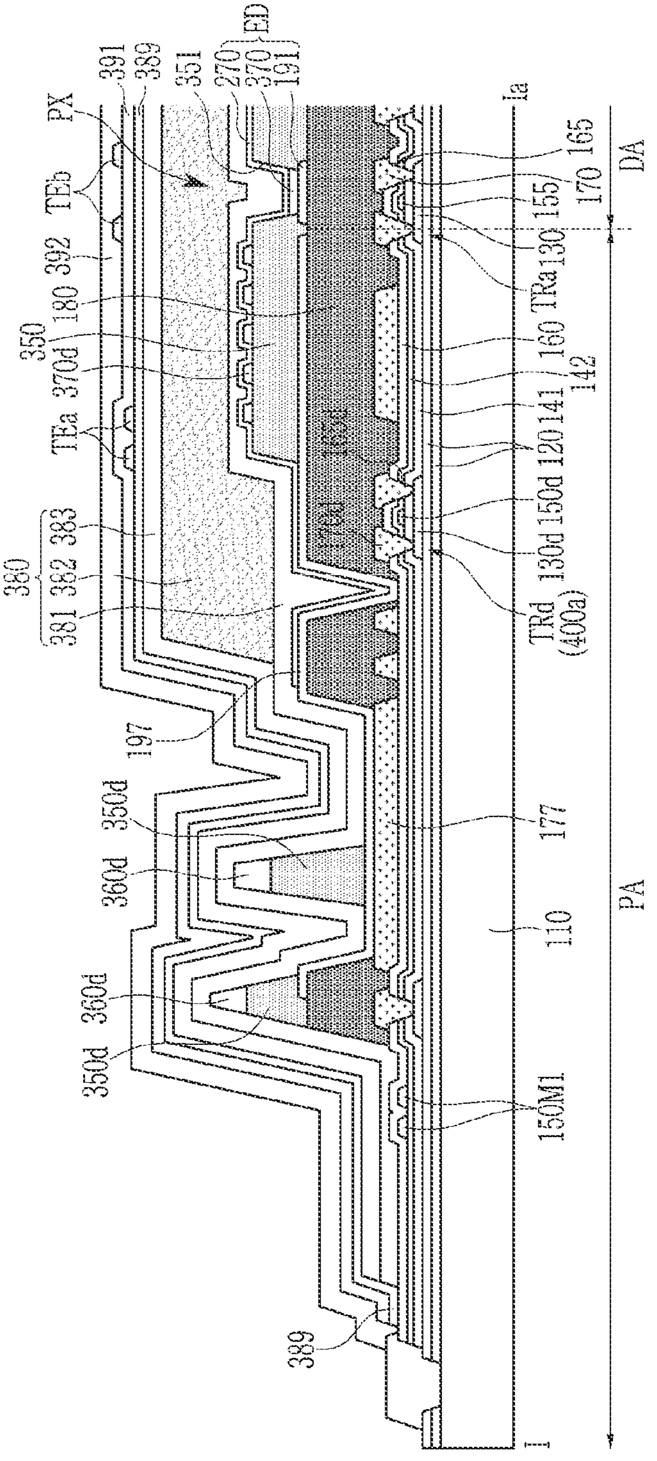
FIG. 6 is a cross-sectional view of a display device taken along a line I-Ia shown in FIG. 1 according to an embodiment.

FIG. 6 is a cross-sectional view of a display device taken along a line I-Ia shown in FIG. 1 according to an embodiment. The cross-sectional structure of the display device is described with reference to FIG. 6 along with one or more of FIG. 1 to FIG. 5.

Referring to FIG. 6, a barrier layer 120 may be positioned on a substrate 110. The barrier layer 120 may include a plurality of layers or may be made of a single layer as shown in the drawing.

An active pattern is positioned on the barrier layer 120. The active pattern may include an active pattern 130 positioned at the display area DA and an active pattern 130*d* positioned at the peripheral area PA. Each of the active patterns 130 and 130*d* may include a source region, a drain region, and a channel region between the source region and the drain region. The active pattern may include amorphous silicon, polysilicon, or an oxide semiconductor.

A first insulating layer 141 may be positioned on the active patterns 130 and 130*d*, and a first conductive layer may be positioned on the first insulating layer 141. The first conductive layer may include a conductor 155 overlapping the active pattern 130 positioned at the display area DA, a conductor 150*d* overlapping the active pattern 130*d* positioned at the peripheral area PA, and the plurality of gate lines 121 and the test gate line 81 as above-described.

The active pattern 130 and the conductor 155 overlapping thereto may together form a transistor TRa, and the active pattern 130*d* and the conductor 150*d* overlapping thereto may together form a transistor TRd. The transistor TRa may function as a switching element included in the pixel PX positioned at the display area DA, and the transistor TRd may function as a switching element included in the gate drivers 400*a* and 400*b*.

A second insulating layer 142 may be positioned on the first conductive layer and the first insulating layer 141, and a second conductive layer may be positioned on the second insulating layer 142. The second conductive layer may include the above-described crack sensing lines 150M1 and 150M2. Alternatively, the crack sensing lines 150M1 and 150M2 may be positioned at the same layer as and may include the same material as the first conductive layer.

The second conductive layer may further include the above-described test data lines 71*a*, 71*b*, 91*a*, and 91*b*, and the like. Alternatively, at least one among the test data lines 71*a*, 71*b*, 91*a*, and 91*b* may be positioned at the first conductive layer.

A third insulating layer 160 may be positioned on the second conductive layer and second insulating layer 142.

At least one among the first insulating layer 141, the second insulating layer 142, and the third insulating layer 160 may include an inorganic insulating material such as silicon nitride ($SiN_x$), silicon oxide ($SiO_x$), silicon oxynitride (SiON), and/or an organic insulating material. A part or entire of at least one of the first insulating layer 141, the second insulating layer 142, and the third insulating layer 160 may be removed in the bending area BDA.

The first insulating layer 141, the second insulating layer 142, and the third insulating layer 160 may include contact holes 165 and 165*d* positioned at the source region and/or the drain region of the transistors TRa and TRd.

A third conductive layer may be positioned on the third insulating layer 160. The third conductive layer may include conductor 170 connected to the source area or the drain area of the transistor TRa through the contact hole 165 and conductor 170*d* connected to the source area or the drain area of the transistor TRd through the contact hole 165, a voltage transmitting line 177, and the above-described data line 171.

At least one among the first conductive layer, the second conductive layer, and the third conductive layer may include a metal such as copper (Cu), aluminum (Al), molybdenum (Mo), or an alloy.

A passivation layer 180 is positioned on the third conductive layer and the third insulating layer 160. The passivation layer 180 may include the inorganic insulating material and/or the organic insulating material such as a polyacrylic resin and a polyimide-based resin, and an upper surface of the passivation layer 180 may be substantially flat.

A pixel electrode layer is positioned on the passivation layer 180. The pixel electrode layer may include a pixel electrode 191 corresponding to each pixel PX of the display area DA, and a voltage transmitting electrode 197 positioned at the peripheral area PA. The voltage transmitting electrode 197 may be physically and electrically connected to the voltage transmitting line 177, thereby receiving a common voltage. The pixel electrode layer may include a semi-transmissive conductive material or a reflective conductive material.

A pixel definition layer 350 is positioned on the passivation layer 180 and the pixel electrode layer. The pixel definition layer 350 may have an opening 351 formed on the pixel electrode 191, and may further include at least one dam portion 350*d* positioned at the peripheral area PA. The dam portion 350*d* may extend to be parallel to the edge of the substrate 110 in a plan view. A spacer 360*d* may be further positioned on the dam portion 350*d*.

The crack sensing lines 150M1 and 150M2 may be positioned outside with respect to the dam portion 350*d*, but are not limited thereto.

The pixel definition layer 350 may include a photosensitive material such as the polyacrylic resin and the polyimide-based resin.

An emission layer 370 is positioned on the pixel electrode 191. The emission layer 370 may include a portion positioned in the opening 351 of the pixel definition layer 350. The emission layer 370 may further include at least one dummy emission layer 370*d* positioned at the peripheral area PA and positioned on the pixel definition layer 350. The emission layer 370 may include an organic emission material or an inorganic emission material.

A common electrode 270 is positioned on the emission layer 370. The common electrode 270 is also formed on the pixel definition layer 350. The common electrodes 270 may be continuously formed throughout the plurality of pixels PX. The common electrode 270 may be physically and electrically connected to the voltage transmitting electrode 197 in the peripheral area PA, thereby receiving the common voltage. The common electrode 270 may include a conductive transparent material.

The pixel electrode 191, the emission layer 370, and the common electrode 270 of each pixel PX together form a light emitting diode (LED) ED, one of the pixel electrode 191 and the common electrode 270 becomes a cathode while the other becomes an anode.

An encapsulating portion 380 protecting and encapsulating the light emitting diode (LED) ED may be positioned on the common electrode 270. The encapsulating portion 380 includes at least one of inorganic layers 381 and 383 and at least one organic layer 382, and the at least one of the inorganic layers 381 and 383 and the at least one organic layer 382 may be alternately stacked. The organic layer 382 includes the organic material and may have a flattening characteristic. The inorganic layers 381 and 383 may include an inorganic material such as an aluminum oxide ($AlO_x$), a silicon oxide ($SiO_x$), a silicon nitride ($SiN_x$), and a silicon oxynitride (SiON).

Since a plane area of the inorganic layers 381 and 383 is wider than a plane area of the organic layer 382, the two inorganic layers 381 and 383 may be vertically in contact with each other in the peripheral area PA. The inorganic layer 381 positioned at the bottom of the inorganic layers 381 and 383 may be in contact with the upper surface of the third insulating layer 160 in the peripheral area PA, but it is not limited thereto. In the peripheral area PA, the encapsulating portion 380 including the inorganic layers 381 and 383 may overlap the crack sensing lines 150M1 and 150M2.

The edge of the organic layer 382 included in the encapsulating portion 380 may be positioned between the dam portion 350*d* and the display area DA. The dam portion 350*d* may function to prevent the organic material from overflowing outside when forming the organic layer 382 of the encapsulating portion 380, and accordingly the outer edge of the organic layer 382 of the encapsulating portion 380 may be substantially positioned more inside than the dam portion 350*d*.

A buffer layer 389 including the inorganic insulating material or/and the organic insulating material may be positioned on the encapsulating portion 380. The buffer layer 389 may be omitted.

A fourth conductive layer is positioned on the buffer layer 389. The fourth conductive layer may include a first touch conductor TEa. A first touch insulating layer 391 may be positioned on the fourth conductive layer, and a fifth conductive layer may be positioned thereon. The fifth conductive layer may include a second touch conductor TEb. A second touch insulating layer 392 may be positioned on the fifth conductive layer. As the first touch conductor TEa or/and the second touch conductor TEb form a capacitive touch sensor, the touch of an external object may be sensed. At least one of the first touch conductor TEa and the second touch conductor TEb may be omitted.

Figure 7:
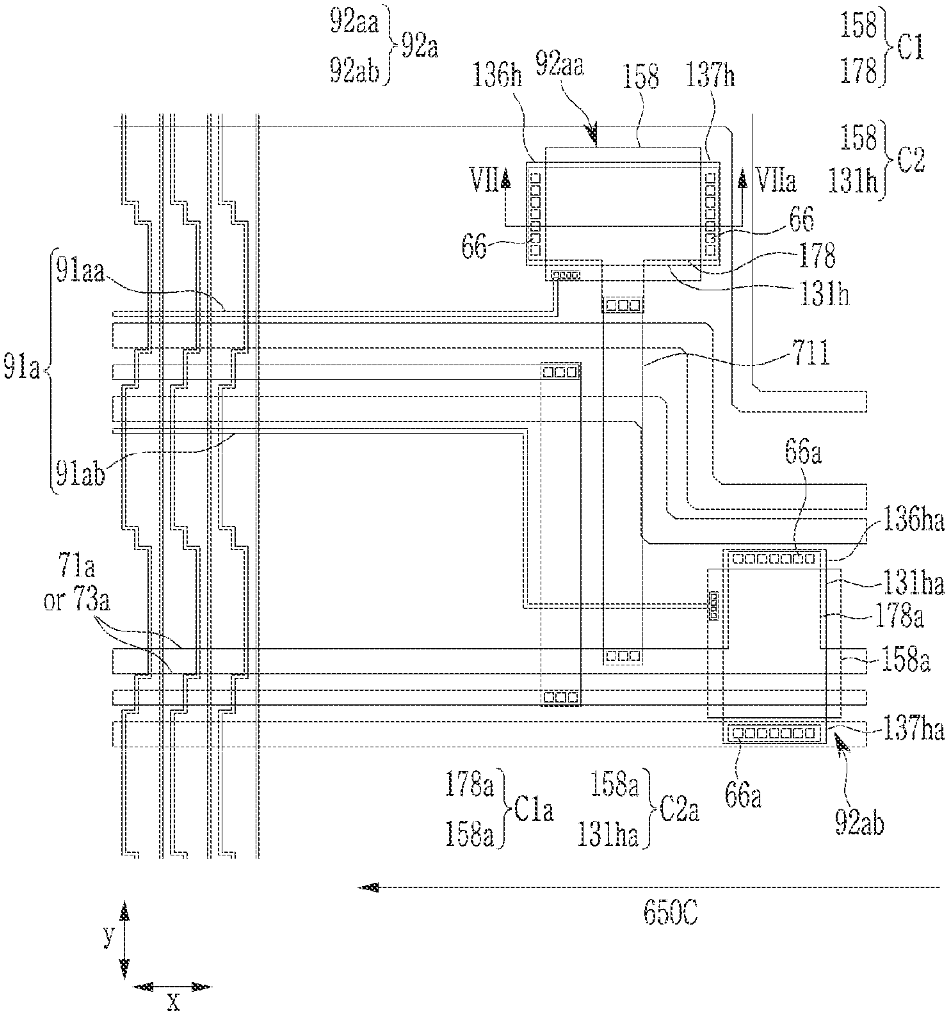
FIG. 7 is a layout view of a part of a circuit area of a display panel according to an embodiment.

FIG. 7 is a layout view of a part of a circuit area of a display panel according to an embodiment. Structures of a static electricity discharge element 92*a* of one or more of the display panels 1000, 1000*a*, 1000*b*, and 1000*c* according to one or more embodiments are described with reference to FIG. 7 and FIG. 8 as well as one or more of FIGS. 1 to 6.

Figure 8:
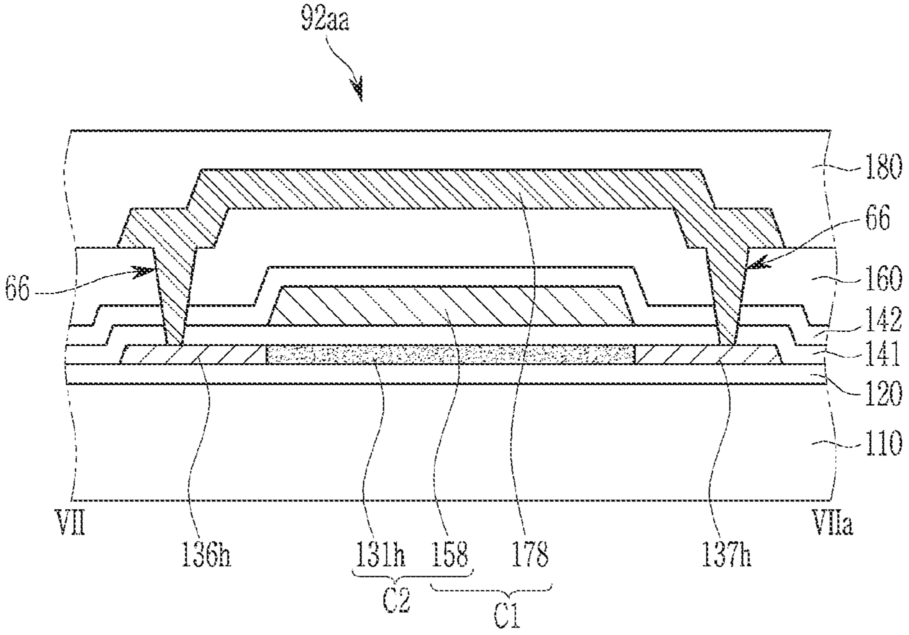
FIG. 8 is a cross-sectional view of a display panel taken along a line VII-VIIa shown in FIG. 7 according to an embodiment.

FIG. 7 shows a left portion among the center area 650C of the circuit area 650 of one or more of the display panels 1000, 1000*a*, 1000*b*, and 1000*c*. FIG. 8 is a cross-sectional view of a display panel taken along a line VII-VIIa shown in FIG. 7 according to an embodiment. The test data line 91*a* may include a plurality of sub-wires 91*aa* and 91*ab*, and each of the sub-wires 91*aa* and 91*ab* is connected to one of static electricity discharge elements 92*aa* and 92*ab* positioned in the center area 650C. The static electricity discharge elements 92*aa* and 92*ab* are included in the static electricity discharge element 92*a*.

Each of the static electricity discharge elements 92*aa* and 92*ab* includes at least one capacitor.

The static electricity discharge element 92*aa* may include a first terminal 158 connected to an end of the sub-wire 91*aa* of the test data line 91*a*, a second terminal 178 connected to the test data line 71*a* (or the connection wire 73*a* shown in FIG. 3), and a third terminal 131*h*.

Referring to FIG. 7 and FIG. 8, the first terminal 158 and the second terminal 178 overlap each other and are separated by at least one insulating layer, for example, via the second insulating layer 142 and the third insulating layer 160, to form the first capacitor C1, which may store and discharge static electricity. The first terminal 158 and the third terminal 131*h* may overlap each other and may be separated by at least one insulating layer, for example, the first insulating layer 141, to form a second capacitor C2, which may store and discharge static electricity. The first terminal 158 and the second terminal 178 are conductive, and the third terminal 131*h* may be a semiconductor. The first terminal 158 may be positioned in the above-described first conductive layer, the second terminal 178 may be positioned in the above-described third conductive layer, and the third terminal 131*h* may be included in the above-described active patterns 130 and 130*d*. Conductive areas 136*h* and 137*h* are positioned at opposite sides of the third terminal 131*h*, and the conductive areas 136*h* and 137*h* may be connected to the third terminal 131*h*. The second terminal 178 may be connected to the conductive areas 136*h* and 137*h* through contact holes 66 included in the first to third insulating layers 141, 142, and 160. Accordingly, the conductive area 136*h* and 137*h* may receive the voltage of the input pad 70*a* transmitted by the test data line 71*a* (or the connection wire 73*a*) along with the second terminal 178. The second terminal 178 may be connected to the test data line 71*a* (or the connection wire 73*a*) through a connection wire 711.

Similarly, the static electricity discharge element 92*ab* may include a first terminal 158*a* connected to an end of the sub-wire 91*ab* of the test data line 91*a*, a second terminal 178*a* connected to the test data line 71*a* (or the connection wire 73*a*), and a third terminal 131*ha*.

The first terminal 158*a* and the second terminal 178*a* may overlap each other and may be separated by at least one insulating layer, for example the second insulating layer 142 and the third insulating layer 160, to form the first capacitor C1*a*, which may store and discharge static electricity. The first terminal 158*a* and the third terminal 131*ha* may overlap each other and may be separated by at least one insulating layer, for example, the first insulating layer 141, to form the second capacitor C2*a*, which may store and discharge static electricity. The first terminal 158*a* and the second terminal 178*a* may be conductive, and the third terminal 131*ha* may be a semiconductor. The first terminal 158*a* may be positioned in the first conductive layer, the second terminal 178*a* may be positioned in the third conductive layer, and the third terminal 131*ha* may be included in the above-described active patterns 130 and 130*d*. Conductive areas 136*ha* and 137*ha* may be positioned at opposite sides of the third terminal 131*ha*, and the conductive areas 136*ha* and 137*ha* may be connected to the third terminal 131*ha*. The second terminal 178*a* may be connected to the conductive areas 136*ha* and 137*ha* through contact holes 66*a* included in the first to third insulating layers 141, 142, and 160. Accordingly, the conductive areas 136*ha* and 137*ha* may receive the voltage of the input pad 70*a* transmitted by the test data line 71*a* (or the connection wire 73*a*) along with the second terminal 178*a*. The second terminal 178*a* may be directly connected to the test data line 71*a* (or the connection wire 73*a*).

As described above, the static electricity discharge element 92*aa* may include the first and second capacitors C1 and C2, and the static electricity discharge element 92*ab* may include the first and second capacitors C1*a* and C2*a*. The first and second capacitors C1, C1*a*, C2, and C2*a* may be referred to as sub-capacitors.

The third terminals 131*h* and 131*ha* and the second capacitors C2 and C2*a* may be unnecessary in an embodiment.

Figure 9:
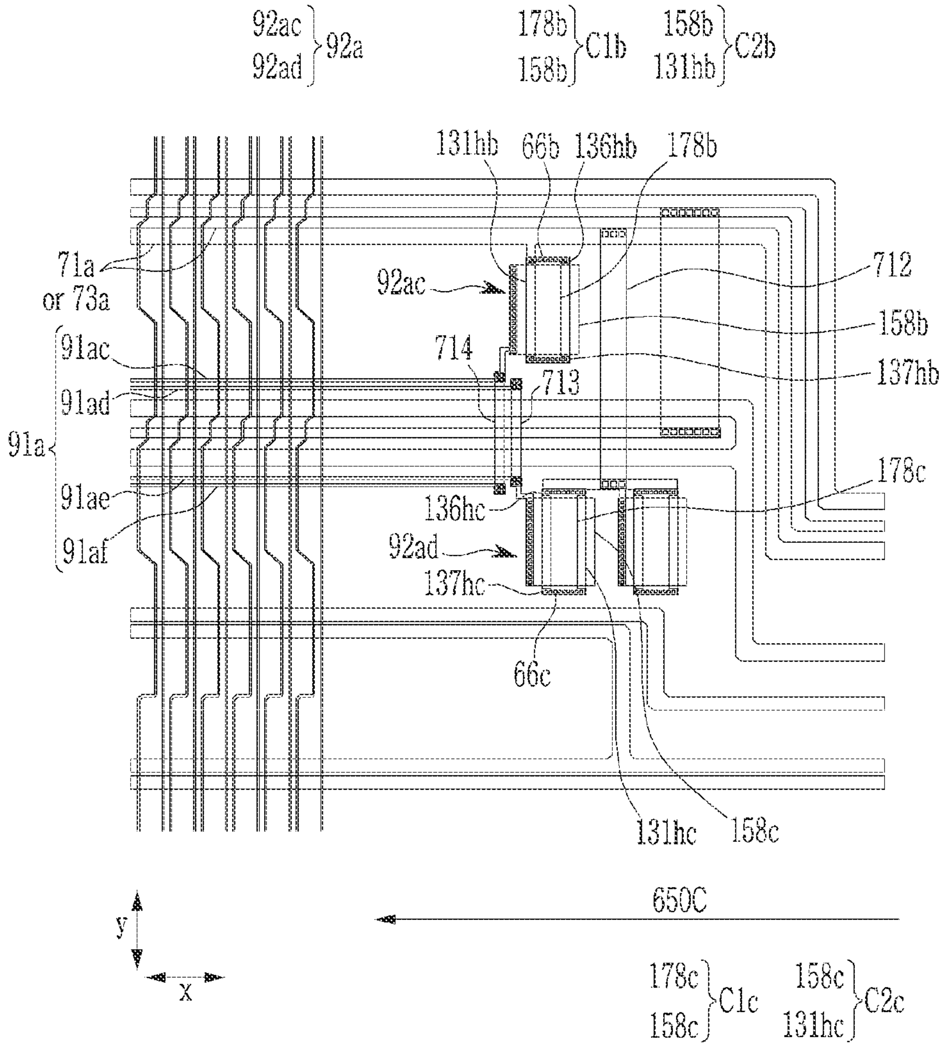
FIG. 9 is a layout view of a part of a circuit area of a display panel according to an embodiment.

FIG. 9 is a layout view of a part of a circuit area of a display panel according to an embodiment. FIG. 9 shows the left portion among the center area 650C of the circuit area 650 of one or more of the display panels 1000, 1000*a*, 1000*b*, and 1000*c* according to one or more embodiments. The test data line 91*a* may include a plurality of sub-wires 91*ac*, 91*ad*, 91*ae*, and 91*af*. A pair of sub-wires 91*ac* and 91*af* may be connected with each other through a connection wire 714, and a pair of sub-wires 91*ad* and 91*ae* may be connected with each other through a connection wire 713. In the center area 650C, the sub-wires 91*ac* and 91*af* are connected to the static electricity discharge element 92*ac*, and the sub-wires 91*ad* and 91*ae* are connected to the static electricity discharge element 92*ad*. The static electricity discharge element 92*ac* and 92*ad* are included in the static electricity discharge element 92*a*.

Each of the static electricity discharge elements 92*ac* and 92*ad* includes at least one capacitor.

The static electricity discharge element 92*ac* may include a first terminal 158*b* connected to an end of each of the sub-wires 91*ac* and 91*af* of the test data line 91*a*, a second terminal 178*b* connected to the test data line 71*a* (or the connection wire 73*a*), and a third terminal 131*hb*. The first terminal 158*b* and the second terminal 178*b* form the first capacitor C1*b*, and the first terminal 158*b* and the third terminal 131*hb* form the second capacitor C2*b*, for storing and discharging static electricity. The first terminal 158*b* and the second terminal 178*b* may be conductive, and the third terminal 131*hb* may be a semiconductor. Conductive areas 136*hb* and 137*hb* may be positioned at opposite sides of the third terminal 131*hb*, and the conductive areas 136*hb* and 137*hb* may be connected to the third terminal 131*hb*. The second terminal 178*b* may be connected to the conductive areas 136*hb* and 137*hb* through contact holes 66*b*.

Similarly, the static electricity discharge element 92*ad* may include a first terminal 158*c* connected to an end of each of the sub-wires 91*ad* and 91*ae* of the test data line 91*a*, a second terminal 178*c* connected to the test data line 71*a* (or the connection wire 73*a*), and a third terminal 131*hc*. The first terminal 158*c* and the second terminal 178*c* form the first capacitor C1*c*, and the first terminal 158*c* and the third terminal 131*hc* form the second capacitor C2*c*, for storing and discharging static electricity. The first terminal 158*c* and the second terminal 178*c* may be conductive, and the third terminal 131*hc* may be a semiconductor. Conductive areas 136*hc* and 137*hc* may be positioned at opposite sides of the third terminal 131*hc*, and the conductive areas 136*hc* and 137*hc* may be connected to the third terminal 131*hc*. The second terminal 178*c* may be connected to the conductive areas 136*hc* and 137*hc* through contact holes 66*c*. The second terminal 178*c* may be connected to the test data line 71*a* (or the connection wire 73*a*) through a connection wire 712.

As described above, the static electricity discharge element 92*ac* may include the first and second capacitors C1*b* and C2*b*, and the static electricity discharge element 92*ad* may include the first and second capacitors C1*c* and C2*c*.

The third terminals 131*hb* and 131*hc* and the second capacitors C2*b* and C2*c* may be unnecessary in an embodiment.

The display device according to an embodiment may be, for example, an organic/inorganic emissive display device or a liquid crystal display.

While example embodiments have been described, practical embodiments are not limited to the described embodiments. Embodiments are intended to cover various modifications and equivalent arrangements within the spirit and scope defined by the appended claims.

What is claimed is:

1. A display device comprising:

a substrate comprising a display area and a peripheral area, the peripheral area including a pad area and a bending area;

a plurality of data lines extending in the display area and the peripheral area;

a first detection line positioned in the peripheral area and electrically connected to at least one data line of the plurality of data lines;

a first line crossing at least one data line of the plurality of data lines; and a first static electricity discharge element, wherein the first detection line includes at least one curved portion forming a loop located in the peripheral area, and one end of the first detection line is electrically connected to the pad area, and another end of the first detection line is electrically connected to the first static electricity discharge element.

2. The display device of claim 1, wherein the pad area comprises a plurality of input pads, and the one end of the first detection line electrically connected to the pad area is connected to the first line.

3. The display device of claim 1, further comprising:

a resistor between the one end of the first detection line and the first line.

4. The display device of claim 1, further comprising:

a second detection line positioned in the peripheral area, wherein the first detection line opposes the second detection line with the display area between the first detection line and the second detection line.

5. The display device of claim 4, wherein the second detection line includes at least one curved portion forming a loop located in the peripheral area, and the curved portion of the second detection line and the curved portion of the first detection line face each other in the peripheral area.

6. The display device of claim 4, wherein the first detection line and the second detection line are symmetrical to each other.

7. The display device of claim 4, further comprising:

a second static electricity discharge element separated from the first static electricity discharge element, wherein the second detection line is electrically connected to the second static electricity discharge element.

8. The display device of claim 7, wherein the first static electricity discharge element and the second static electricity discharge element are symmetrical to each other.

9. The display device of claim 1, wherein the first detection line overlaps at least a portion of a bending area.

10. The display device of claim 9, wherein the bending area is disposed between the display area and the pad area.

11. The display device of claim 10, wherein the bending area is disposed between the display area and the first static electricity discharge element.

12. The display device of claim 1, further comprising:

a first switching element, wherein an input terminal of the first switching element is electrically connected to one end of the first detection line, and an output terminal of the first switching element is electrically connected to a first data line of the plurality of data lines.

13. The display device of claim 12, further comprising:

a second switching element, wherein an input terminal of the second switching element is electrically connected to another end of the first detection line, and an output terminal of the second switching element is electrically connected to a second data line of the plurality of data lines.

14. The display device of claim 1, further comprising:

a second line crossing at least one data line of the plurality of data lines, wherein the first line and the second line are spaced apart from each other and not electrically connected to each other.

15. The display device of claim 14, wherein the first static electricity discharge element is disposed between the first line and the second line.

16. The display device of claim 15, wherein the first line and the second line are aligned with each other in a first direction.

17. The display device of claim 1, wherein the first line is shorter than the first detection line.

18. The display device of claim 1, wherein the first static electricity discharge element comprises a first capacitor electrically connected to the first line.

19. The display device of claim 1, further comprising a connection wire electrically connected to the first detection line and extending parallel to the first line, wherein the first static electricity discharge element is electrically connected through the connection wire to the first line.

20. The display device of claim 1, further comprising:

a voltage transmitting line positioned between the first detection line and the display area.

* * * * *